United States Patent

[11] 3,630,233

| [72] | Inventor | Koji Miyamoto |
| | | Tokyo, Japan |
| [21] | Appl. No. | 8,484 |
| [22] | Filed | Feb. 4, 1970 |
| [45] | Patented | Dec. 28, 1971 |
| [73] | Assignee | Kayabakogyo Kabushiki Kaisha |
| [32] | Priorities | Dec. 28, 1969 |
| [33] | | Japan |
| [31] | | 44/123690; |
| | | Dec. 28, 1969, Japan, No. 44/123689; Dec. 23, 1969, Japan, No. 44/103034; Feb. 7, 1969, Japan, No. 44/8711 |

[54] POWER STEERING SYSTEM
6 Claims, 24 Drawing Figs.

[52] U.S. Cl. .................................... 137/625.69,
91/368, 91/375
[51] Int. Cl. ..................................... F16k 11/07,
F15b 13/16
[50] Field of Search ........................... 251/78,
229, 279; 91/368, 375; 137/625.69

[56] References Cited
UNITED STATES PATENTS
2,703,636  3/1955  Long ........................... 251/78 X
2,707,375  5/1955  Hammond .................... 91/368 X
2,983,283  5/1961  Sattavara ..................... 251/229

*Primary Examiner*—Henry T. Klinksiek
*Attorney*—Saul Jecies

ABSTRACT: A power steering system has a power cylinder assembly for turning the steering road wheels of a vehicle and a valve mechanism which is actuated in response to the steering action. The valve mechanism comprises a valve housing coupled to the power cylinder assembly, a valve spool fitted into the valve housing, a pair of head levers pivotably fixed on both sides of the valve spool in such a manner that the one ends of said pair of head levers may firmly press against both ends of the valve spool respectively, and lever rods slidably fitted into the valve housing in such a manner that free ends of the lever rods may firmly press against the other ends of the pair of head levers. The lever rods are coupled to a guide pin extending from an input shaft which in turn is coupled to the steering wheel, and the input shaft is coupled through a torsion bar to the valve housing so that in response to the relative angular displacement between the input shaft and the valve housing upon steering, the valve spool is shifted through the guide pin, the lever rods and the pair of head levers, whereby the working liquid under pressure is selectively forced into one of the right and left pressure chambers in the power cylinder assembly, thereby turning the steering road wheels.

INVENTOR.
Koji Miyamoto

INVENTOR.
Koji Miyamoto

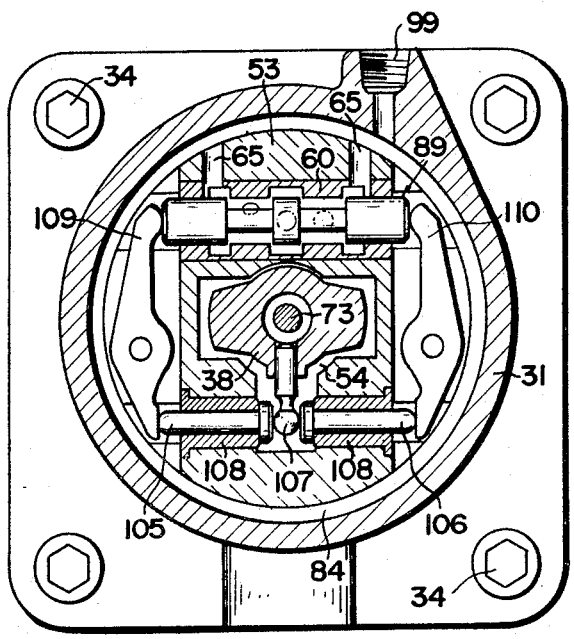
FIG. 6
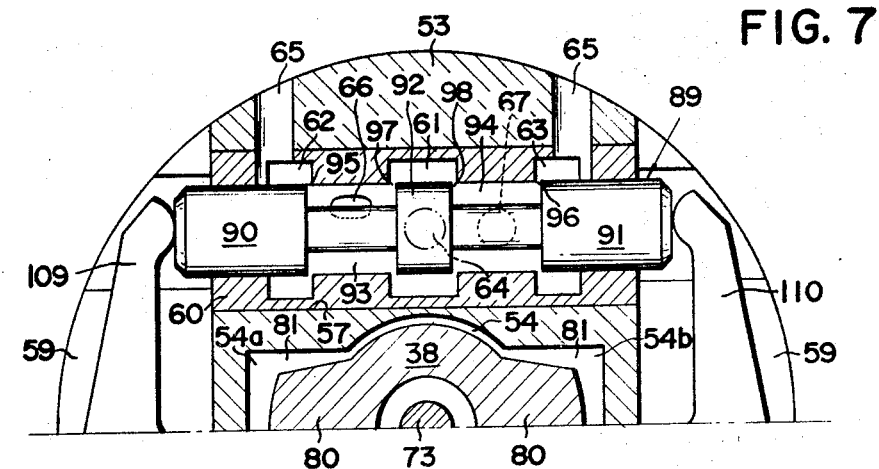
FIG. 7
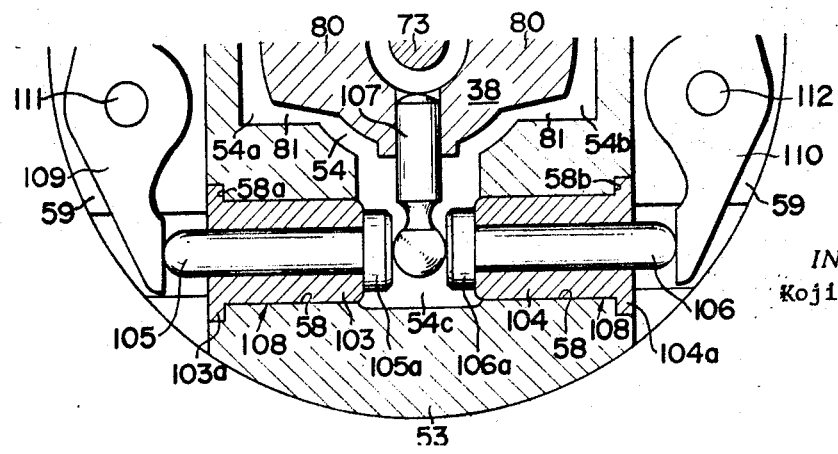
INVENTOR.
Koji Miyamoto

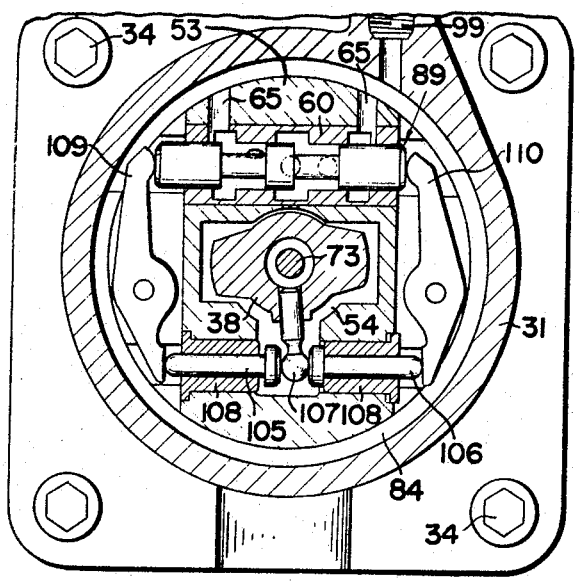
FIG. 8
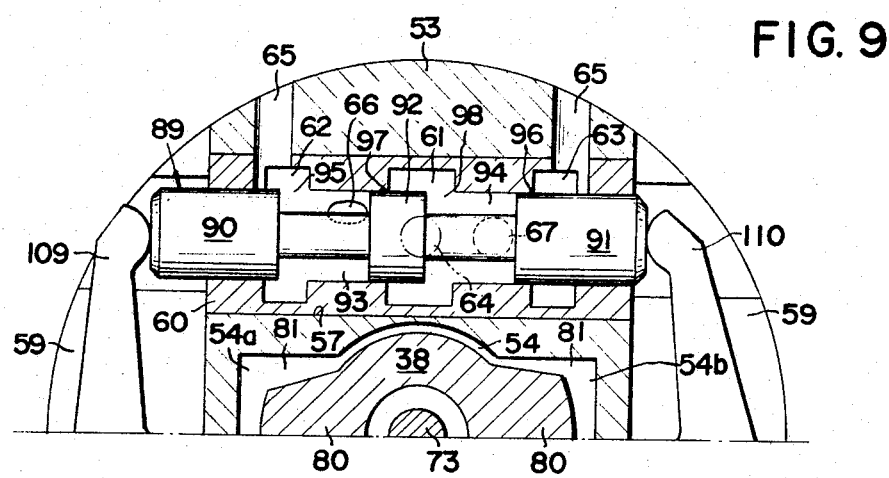
FIG. 9
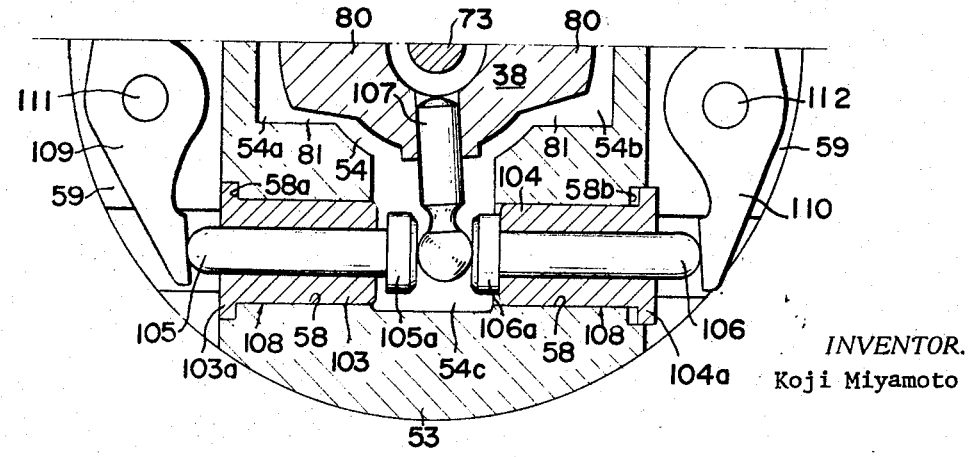
INVENTOR.
Koji Miyamoto

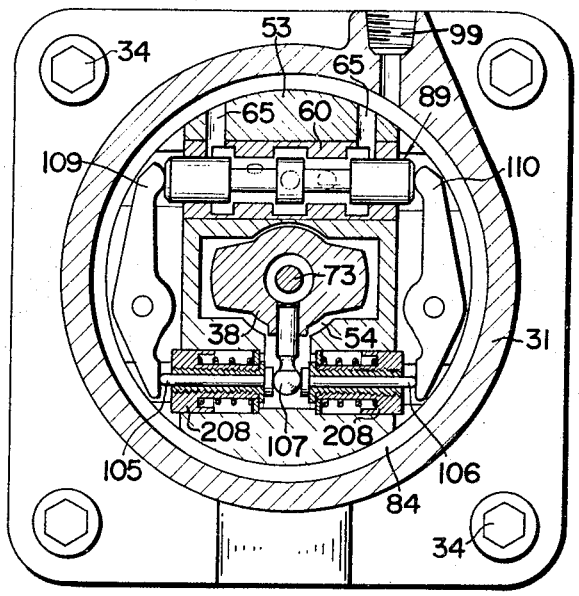
FIG. 11
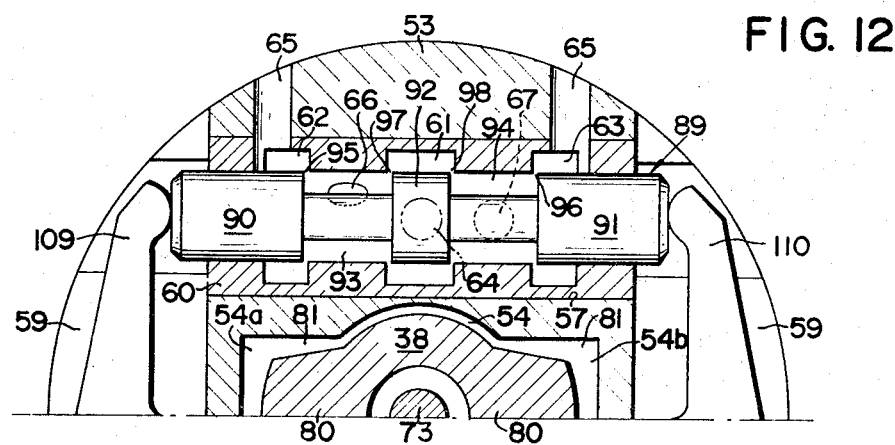
FIG. 12
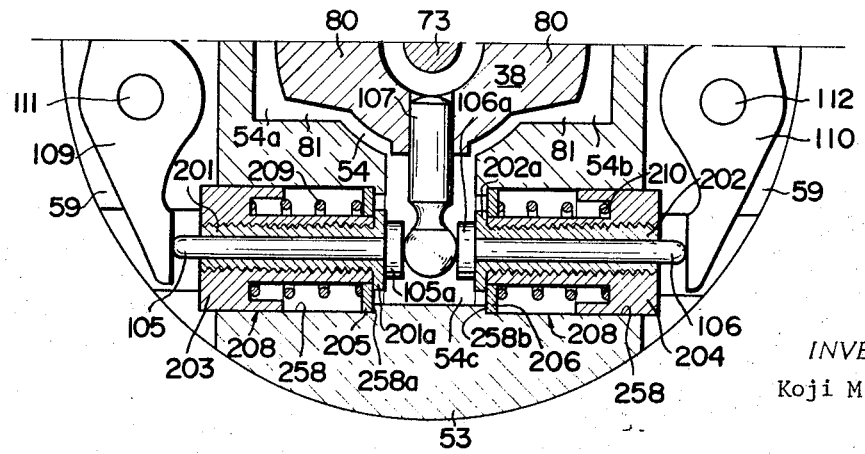
INVENTOR.
Koji Miyamoto

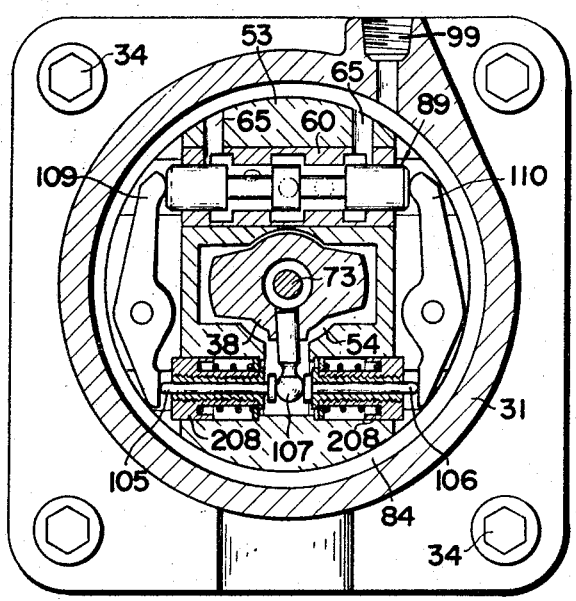
FIG. 13
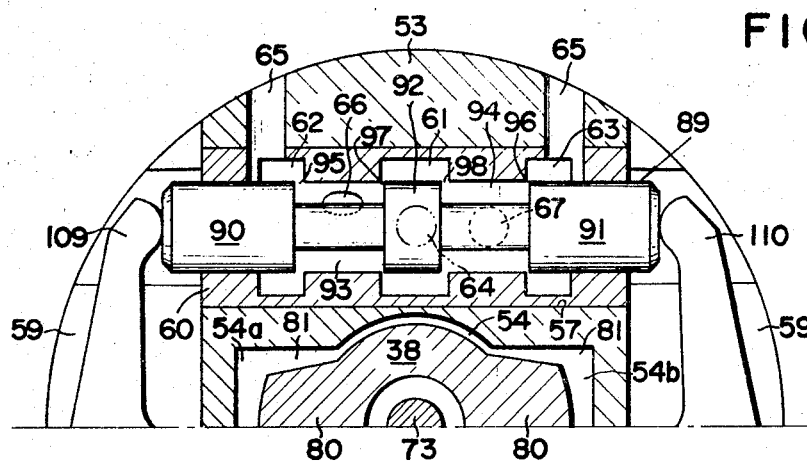
FIG. 14
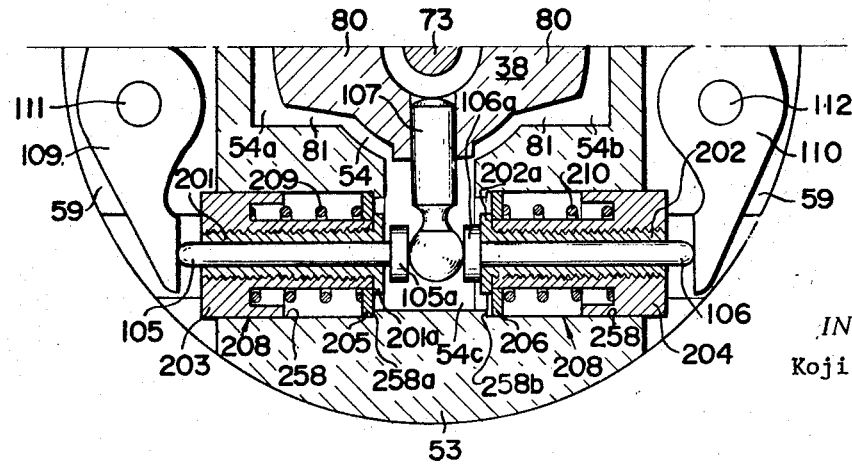
INVENTOR.
Koji Miyamoto

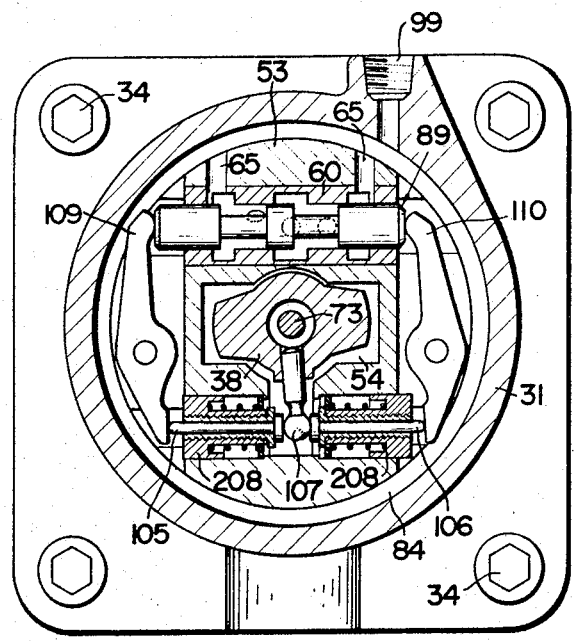
FIG. 15
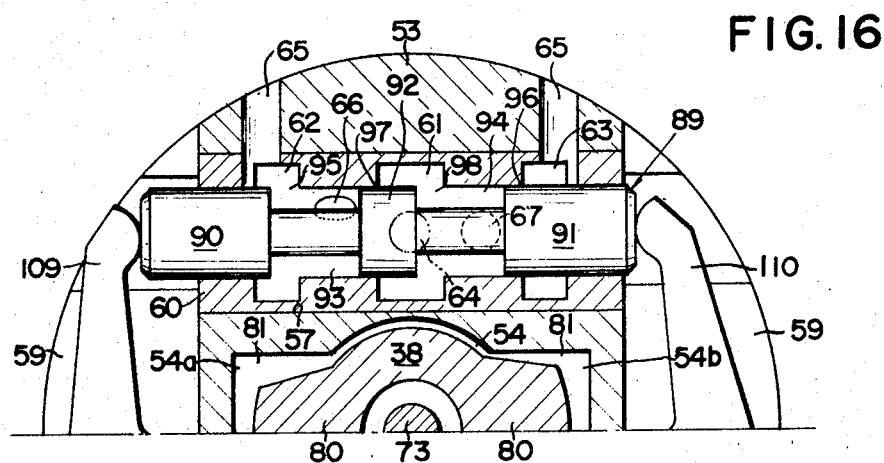
FIG. 16
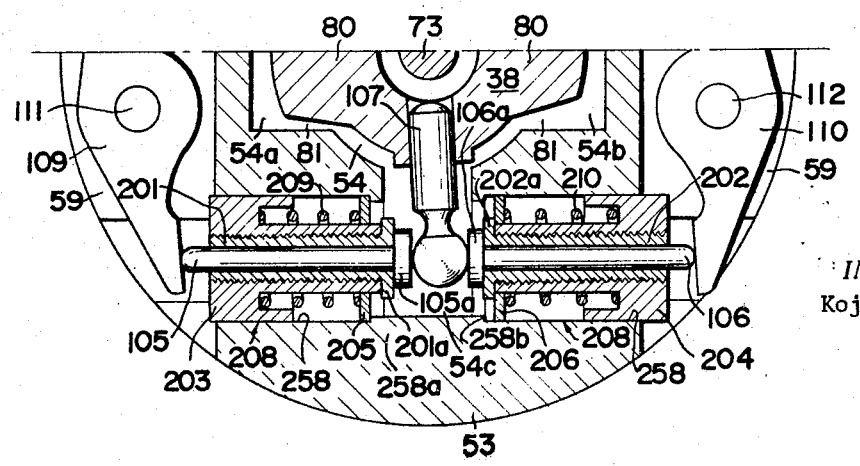
INVENTOR.
Koji Miyamoto

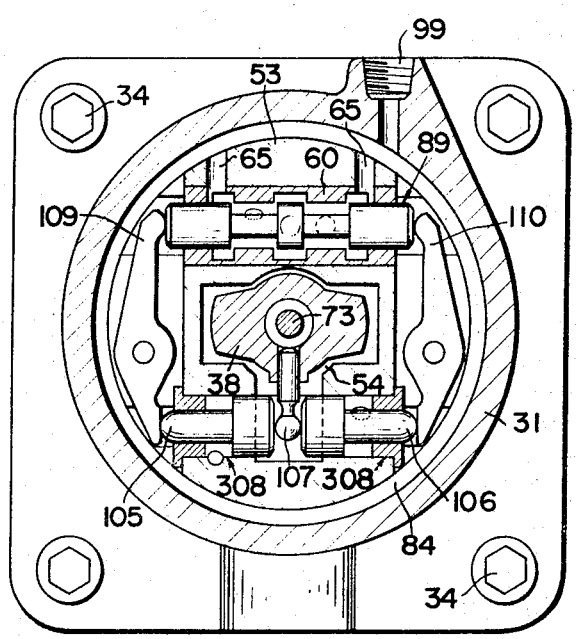
FIG. 18
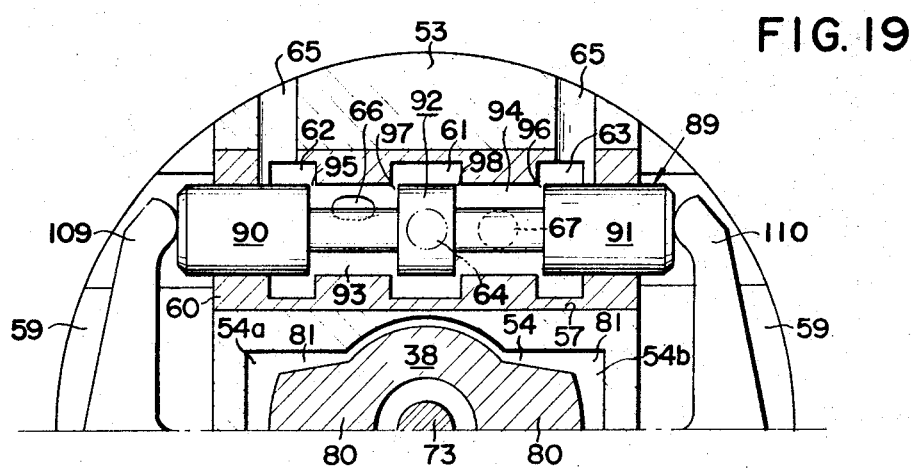
FIG. 19
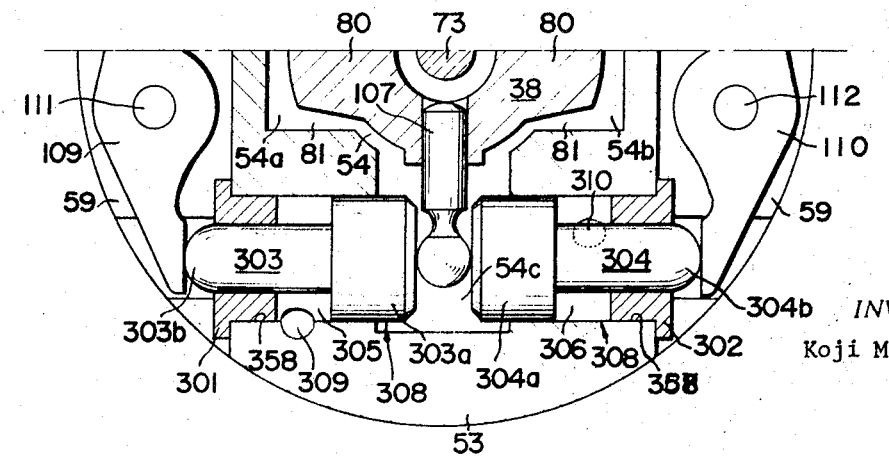
INVENTOR.
Koji Miyamoto

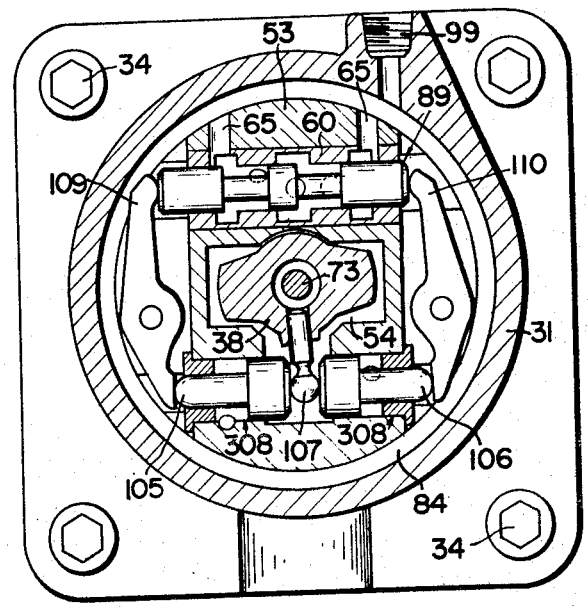
FIG. 20
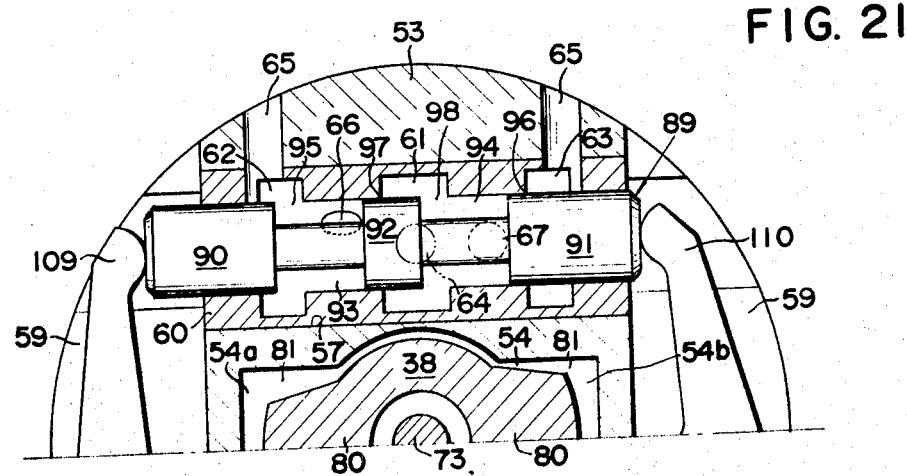
FIG. 21
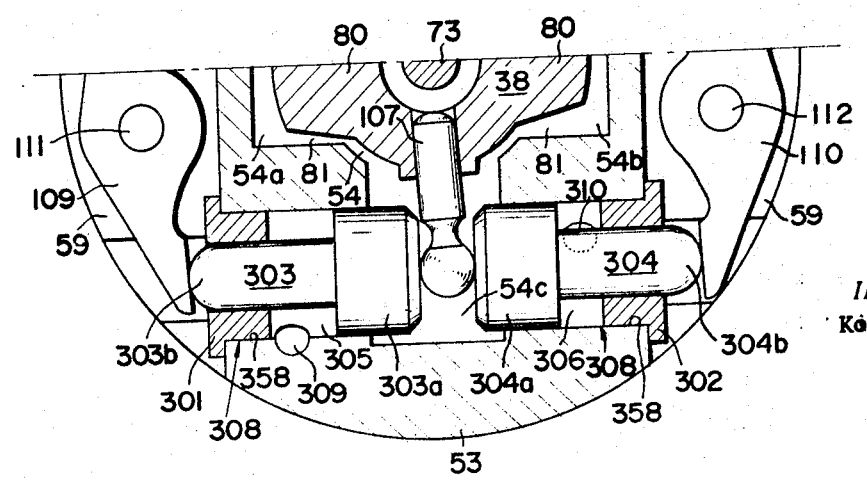
INVENTOR.
Koji Miyamoto

*INVENTOR.*
Koji Miyamoto

POWER STEERING SYSTEM

BACKGROUND OF THE INVENTION

The present invention relates generally to a vehicle power steering system using hydraulic pressure, and more particularly to a servo valve for a hydraulic power steering system.

Principal hydraulic power steering systems are classified into a booster type in which the power steering system is interposed between the chassis and the steering linkage system and a valve mechanism is operatively coupled to a pitman arm, and an integral type in which the power steering system is directly coupled instead of the steering gear of the conventional mechanical steering system in such a manner that a valve may be actuated in response to the rotation of the steering shaft. In the integral-type power steering system the steering or input shaft is slightly moved along its axis upon steering and the valve spool is caused to slide in response this movement so as to switch the valve. This is one of the most widely used systems known as "spool valve system." In this system, the screw shaft made integral with the input or steering shaft is rotatably disposed for movement in the axial direction relative to the housing or casing accommodating the spool valve comprising the valve housing and the valve spool. The valve housing is anchored to the casing and the valve spool is so fitted into the valve housing that the axial movement toward the screw shaft of the valve spool may be limited. Springs are interposed between the inner surfaces of the casing and both ends of the valve spool so that both the screw shaft and the valve spool may be normally held in neutral position. A piston which is slidably fitted into the casing is coupled to the screw shaft through bearing balls. A rack of the piston is in mesh with a sector gear fixed to the pitman arm. When the valve spool is in neutral position, the working liquid under pressure supplied by a hydraulic pump is returned to a reservoir through throats of the valve spool so that the pressure in the right and left pressure chambers defined within the casing by the piston may be maintained at the same pressure level. When the steering wheel is rotated, the screw shaft is rotated and at the same time moved slightly along its axis by use of the resistance of the piston, whereby the valve spool is shifted toward a desired direction, thereby forcing the working liquid into one of the pressure chambers selectively. Therefore, the hydraulic pressure acts upon one end of the piston so that the piston is moved in one direction when the screw shaft is rotated, thereby turning the steering road wheels.

In the power steering system of the type described above, the switching operation of the spool valve is made through the screw shaft and the bearing balls interposed between the screw threads and the piston which is screwed to the screw shaft, so that the play or gap between the bearing balls and the screw threads will immediately affect the response of the movement of the valve spool, that is the valve performance when steering is effected. Consequently, there is a limit to the valve performance and there exists a time lag between the actual steering of the steering road wheels and the turning of the steering wheel. This time lag adversely affects the maneuverability of a vehicle especially when it is travelling at high speed. In other words, the dimensional tolerance of the bearing ball and screw threads assembly greatly affects the overall performance of the power steering system. In one type of power steering system a rotary valve is used instead of a spool valve of the character described above. The rotary valve is rotatably disposed within a casing, and the valve housing of this rotary valve is anchored to a screw shaft which in turn is coupled to a pitman arm and the valve rotor is anchored to a stub shaft which in turn is coupled to a steering wheel. The screw shaft is coupled to the stub shaft through a torsion bar which serves as a spring member so that the valve housing and the valve rotor may normally be held in neutral position by the torsion bar. Upon steering, the stub shaft is rotated through the steering wheel so that a relative angular deviation between the screw shaft and the stub shaft may be produced while the torsion bar is twisted, whereby the rotary valve comprising the valve housing and the valve rotor is switched. Thus the working liquid under pressure is selectively forced into one of the right or left pressure chambers defined by a piston in a power cylinder assembly, thereby effecting the steering. This rotary valve type power steering system is well known in the art. This power steering system is superior to the above-described spool valve type power steering system because the play or gap in the bearing ball and screw thread assembly will not adversely affect the valve performance. However, the production of such rotary valves requires the high technical level and skilled labor, and the rotary valves are complex in construction and expensive to manufacture.

In order to eliminate such defects as described above, there has been proposed a so-called spool valve-torsion bar type power steering system in which a spool valve is slidably fitted into a valve housing coupled to a screw shaft; an arm is directly extended from a stub shaft which is coupled to a steering wheel in such a manner that the leading end of the arm is fitted into a valve spool on the side of the valve housing; the stub shaft and the screw shaft are coupled to each other through a torsion bar as in the case of the rotary valve power steering system; and in response to the relative angular displacement between the stub shaft and the screw shaft upon steering, the valve spool is displaced in a desired direction relative to the valve housing through the arm extending from the stub shaft. Since the torsion bar is employed as in the case of the rotary valve type power steering system described hereinabove, the response in steering can be improved to the level of the above-described spool valve type power steering system. Furthermore, since the spool valve is also used, the production is simple at less cost as compared with the rotary valve type power steering system. However, the above-described spool valve-torsion bar type power steering system has a serious problem in that, when the displacement of the spool valve is made longer relative to the angle of rotation of the steering wheel in order to improve the steering response, which is very important to improve the maneuverability of a vehicle at high speed, the arm extending from the stub shaft and fitted into the spool valve must be extended further. This means that the more the steering response is to be improved, the larger the outer diameter of the valve assembly becomes so that there arises a problem for providing a large space in a vehicle for incorporating such large-diameter valve mechanism.

In the power steering system of the character described above, the steering torque by which a driver feels the road is given only by the twisting of the torsion bar which is in proportion to the steering resistance of the steering road wheels, so that the driver may feel the road as in the case of the manual steering system. However, there is a serious problem how to incorporate such hydraulic reaction mechanism into a power steering system having only a limited space. Furthermore, when such hydraulic reaction mechanism is employed, the load pressure acting upon the power cylinder assembly is considerably increased especially when the vehicle is at rest so that the steering resistance of the steering road wheels is very high. Therefore the hydraulic reaction force acting upon the steering wheel is inevitably increased so that the driver must exert much force to turn the steering wheel. To eliminate this defect, the reaction force produced by the hydraulic reaction mechanism may be suitably selected, but when the steering resistance is substantially smaller as the vehicle travels at high speed, the load pressure acting upon the power cylinder assembly is exceedingly decreased so that the maneuverability at high speed is adversely affected. Therefore, there has been an urgent need for eliminating such defects as described above especially in a power steering system for a high-speed vehicle.

SUMMARY OF THE INVENTION

In view of the above, the primary object of the present invention is to provide an improved spool valve-torsion bar type power steering system in which a valve spool is slidably fitted into a valve housing; a pair of head levers are pivotally disposed on both sides of said valve spool respectively in such a manner that the one ends of said head levers may be firmly pressed against both ends of said valve spool respectively; and lever rods are slidably fitted into said valve housing in such a manner that free ends of said lever rods may be firmly pressed against the other ends of said pair of head levers respectively so that said pair of head levers may be operatively coupled to a stub shaft through said lever rods and an arm extending from said stub shaft, whereby the valve performance can be remarkably improved without increasing the outer diameter of the valve assembly. Another object of the present invention is to provide a spool valve-torsion bar type power steering system in which hydraulic reaction mechanisms are provided on both sides of said lever rods whereby the power steering system may incorporate therein said hydraulic reaction mechanisms in a simple construction.

A further object of the present invention is to provide a novel spool valve-torsion bar type power steering system in which said hydraulic reaction mechanisms are provided with means for cutting off the high pressure so that when the hydraulic pressure which produces the reaction force is in excess of a predetermined value, this hydraulic pressure is automatically cut off, thereby producing an optimum steering torque when a vehicle is traveling at high speed so as to improve its maneuverability while, when the vehicle is at rest or traveling at lower speed, less steering effort is required.

A still further object of the present invention is to provide a spool valve-torsion bar type power steering system incorporating therein a steering torque correction mechanism in which by use of the load pressure, the force for further turning the steering wheel is produced instead of applying the hydraulic reaction force which acts to returning the steering wheel to its normal position when steered, thereby reducing the steering torque which is in proportion to the angle of twist of the torsion bar, whereby the maneuverability of a vehicle at high speed can be ensured while easy steering is also ensured when the vehicle is at rest or travelling at low speed.

The above and other objects, features and advantages of the present invention will become more apparent from the following description of three illustrative embodiments thereof taken in conjunction with the accompanying drawings.

BRIEF DESCRIPTION OF THE DRAWING

FIG. 6 is a longitudinal sectional view taken along the line 6—6 of FIG. 1 when the steering wheel is not rotated;

FIG. 7 is an enlarged sectional view illustrating in more detail the valve mechanism of FIG. 6;

FIG. 8 is a view similar to FIG. 6 but showing the position when the steering wheel is rotated;

FIG. 9 is a view similar to FIG. 7 illustrating the valve mechanism in FIG. 8 in more detail;

FIG. 11 is a longitudinal sectional view taken along the line 11—11 of FIG. 10 showing the position when the steering wheel is not rotated;

FIG. 12 is a longitudinal sectional view illustrating in more detail the valve mechanism of FIG. 11;

FIG. 13 is a view similar to FIG. 11 when the steering wheel is rotated so that the hydraulic reaction force is applied to the steering wheel by the hydraulic reaction mechanisms;

FIG. 14 is a view similar to FIG. 12 illustrating in more detail the valve mechanism of FIG. 13;

FIG. 15 is a view similar to FIG. 11 showing the position when the steering wheel is rotated and the reaction force produced by the hydraulic reaction mechanisms is cut off;

FIG. 16 is a view similar to FIG. 12 illustrating in more detail the valve mechanism of FIG. 15;

FIG. 18 is a sectional view taken along the line 18—18 of FIG. 17 showing the position when the steering wheel is not rotated;

FIG. 19 is a sectional view illustrating in more detail the valve mechanism of FIG. 18;

FIG. 20 is a view similar to FIG. 18 showing the position when the steering wheel is rotated;

FIG. 21 is a view similar to FIG. 19 illustrating in more detail the valve mechanism of FIG. 20.

DESCRIPTION OF THE PREFERRED EMBODIMENTS

Figure 1:
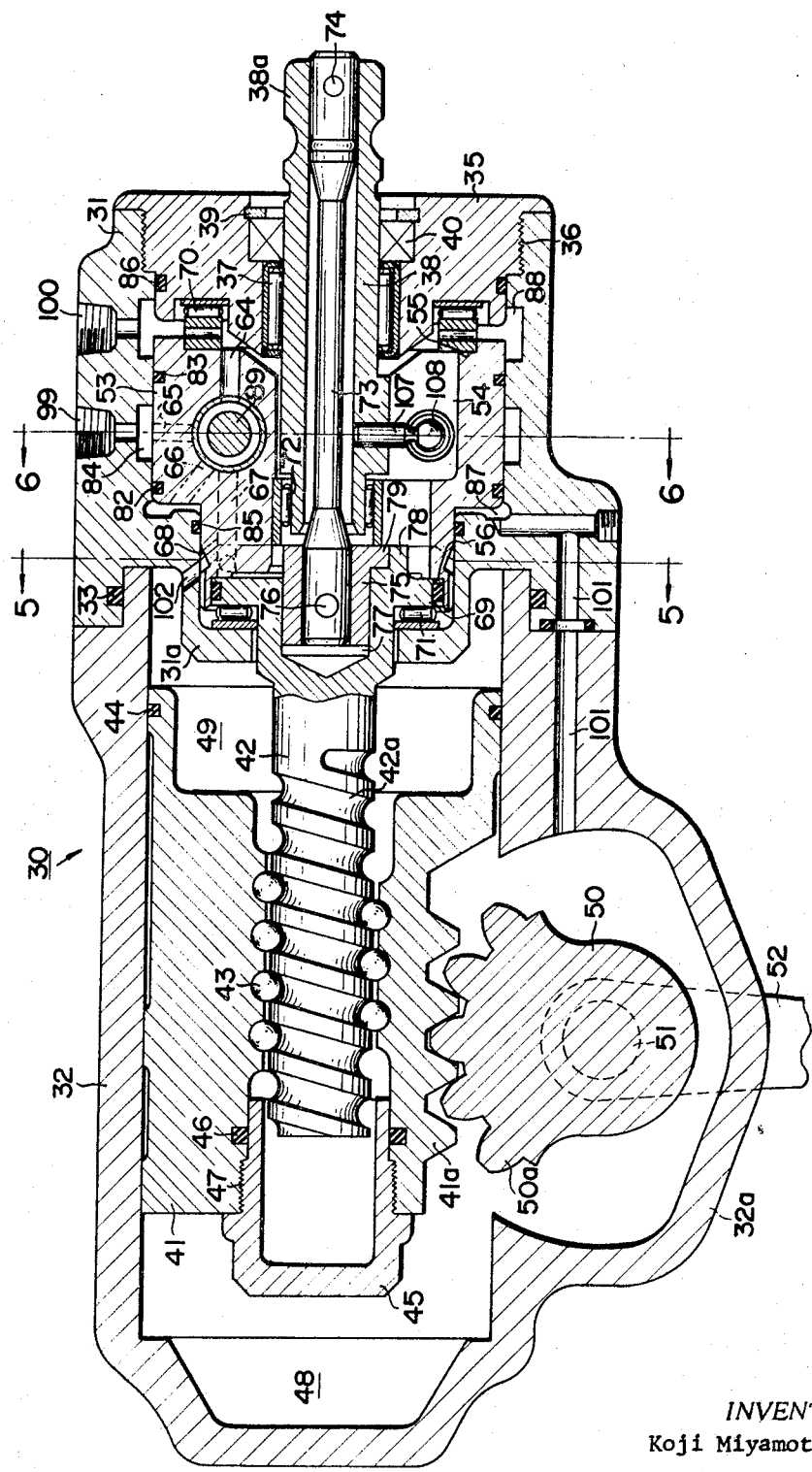
FIG. 1 is a longitudinal sectional view of a first embodiment of the present invention.

Referring to FIG. 1 illustrating a sectional view of one embodiment of the present invention, a power steering device generally designated by 30 is generally comprised of a valve side housing 31 and power cylinder housing 32 both of which are assembled into a unitary construction through a seal 33 by means of bolts 34 (see FIG. 6). Within the valve side housing 31 is disposed a valve mechanism to be described in more detail hereinafter and at one end (the right in FIG. 1) of the valve side housing 31 is fixed a cover 35 which serves to retain a bearing 37 through the threadable engagement at 36. An input shaft or stub shaft 38 is journaled by the needle bearing 37 and is extended toward the right in FIG. 1 outwardly of the cover 35 as indicated at 38a. This projected portion 38a is linked with steering wheels (not shown). The stub shaft 38 and the housing cover 35 are sealed by an oil seal 40 fixed within the cover 35 by means of a snapring 39.

Element 32 is the power cylinder housing of an output mechanism. A sliding piston 41 is fitted into the power cylinder housing 32 and a screw shaft or output shaft 42 is rotatably fitted in the hole bored through the piston 41 so as to engage therewith through balls 43 fitted into the recesses of externally threaded portion 42a of the screw shaft 42. The piston 41 is provided with a seal 44 which is disposed around the outer periphery of one end of the piston 41 for slidable engagement with the inner wall of the cylinder housing 32. A cap-shaped cover 45 is screwed to the leading end of the piston 41 at 47 and a sealing member 46 is interposed between the piston 41 and the cap-shaped cover 45. The piston 41 divides the space within the cylinder housing 32 into two pressure chambers 48 and 49. A rack 41a is formed at the undersurface of the piston 41 for engagement with the teeth 50a of a sector gear 50 pivoted in a bulged portion 32a of the cylinder housing 32. When the hydraulic pressure in either of the pressure chambers 48 and 49 increases so that the piston 41 is pushed in either direction, the screw shaft 42 is caused to rotate via the balls 43 and the externally threaded portion 42a of the screw shaft 42 and at the same time the sector gear 50 is also caused to rotate via the rack 41a and the teeth 50a of the sector gear 50. Therefore, the steering road wheels (not shown) are steered through a pitman arm 52 fixed to the pivot 51 of the sector gear 50.

Figure 2:
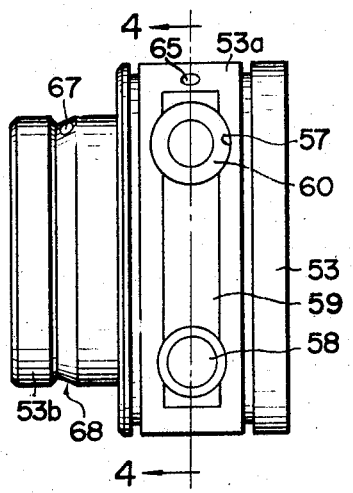
FIG. 2 is a front view of a valve housing thereof.
Figure 3:
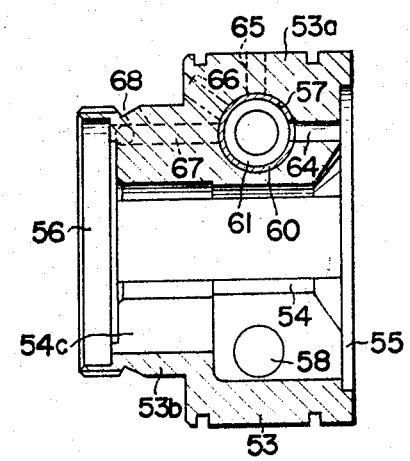
FIG. 3 is a longitudinal sectional view thereof.
Figure 4:
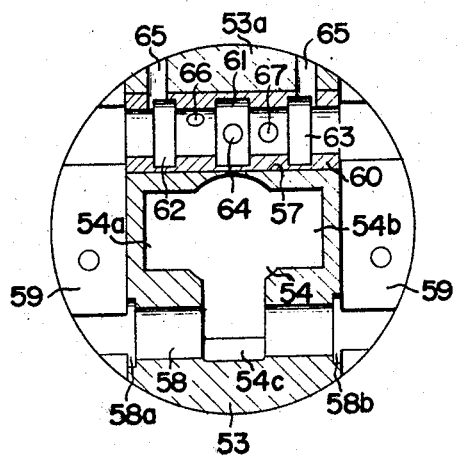
FIG. 4 is a longitudinal sectional view taken along the line 4—4 of FIG. 2.

Within the valve side housing 31 is rotatably disposed a valve housing 53 in slidable engagement with the inner surface of the housing 31. As best shown in FIGS. 2 to 4, the valve housing 53 has a large diameter portion 53a, a small diameter portion 53b, a through bore 54 consisting of grooves 54a, 54b and 54c, a circular recess 55 formed at the end face of the large-diameter portion 53a, a circular recess 56 at the end face of the small-diameter portion 53b, a valve hole 57 bored in the large-diameter portion 53a so as not to communicate with the through bore 54, the direction of the valve hole 57 being at a right angle relative to the through bore 54 and a lever hole 58 bored at a right angle relative to the groove 54c of the through bore 54. On both ends of the openings of the valve hole 57 and the lever hole 58 of the large diameter portion 53a there are formed recesses 59.

A valve sleeve 60 is fitted into the valve hole 57 and three annular grooves 61, 62 and 63 are formed in the inner surface of the valve sleeve 60. The center annular groove 61 is communicated with the recess 55 at the end face of the large-diameter portion 53a through a bore 64 while the annular grooves 62 and 63 are communicated with the outer periphery of the large-diameter portion 53a through bores 65. The space between the center annular groove 61 and the left annular groove 62 is communicated with the other end face of the large-diameter portion 53b remote from the end face thereof having the recess 55 through a bore 66, while the space between the center annular groove 61 and the right annular groove 63 is communicated through a bore 67 with an annular passage 68 formed in the outer peripheral surface at the end portion of the small-diameter portion 53b.

Figure 5:
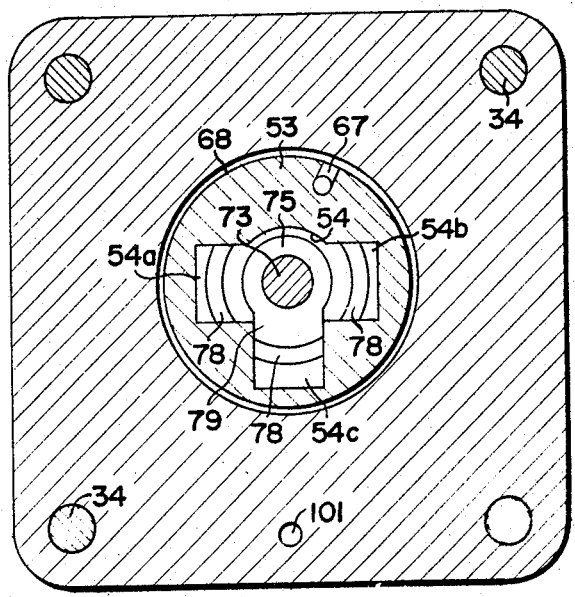
FIG. 5 is a longitudinal sectional view taken along the line 5—5 of FIG. 1.
Figure 10:
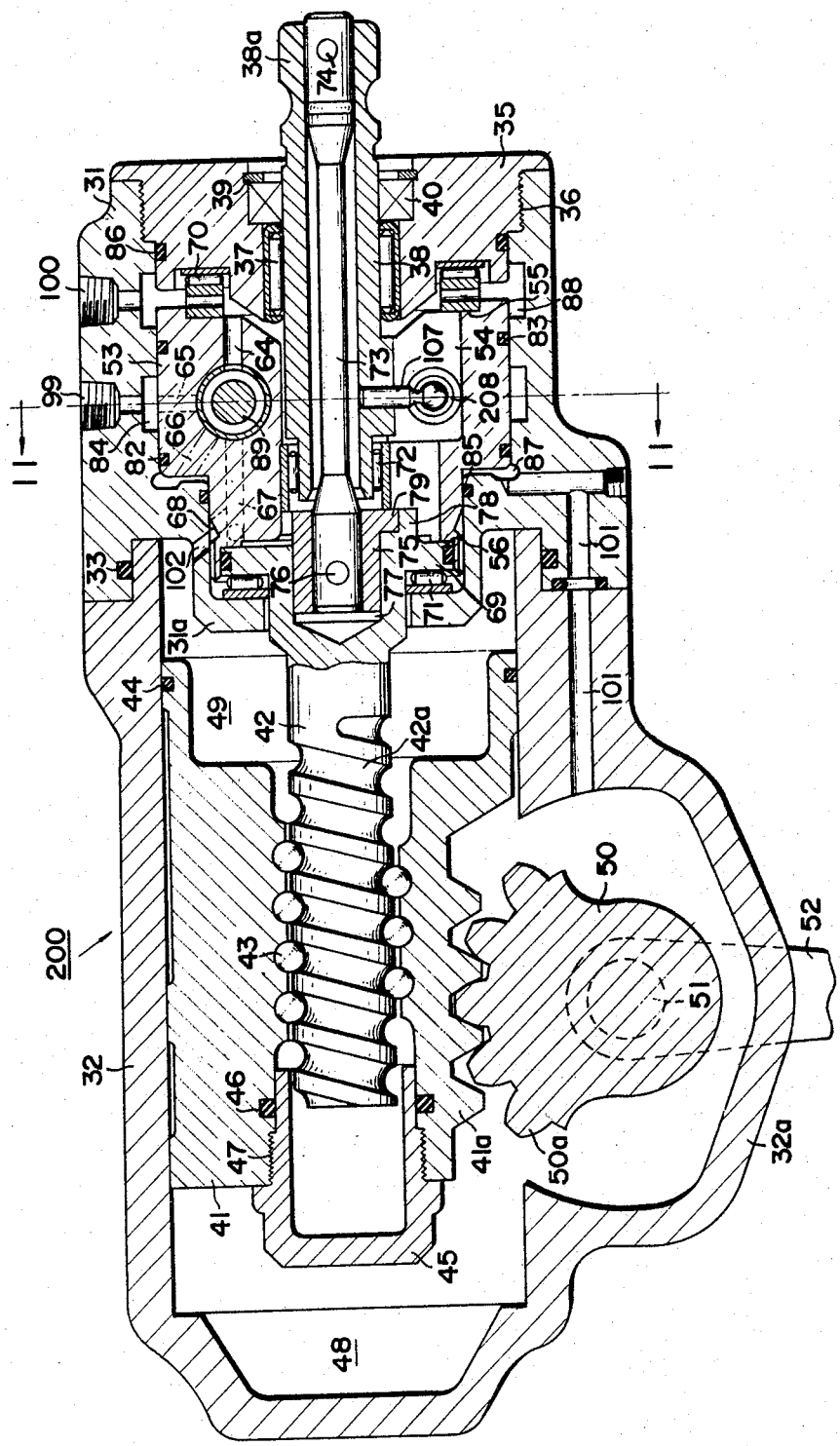
FIG. 10 is a longitudinal sectional view of a second embodiment of the present invention incorporating therein hydraulic reaction mechanisms having the reaction force cutting-off function.

Referring back to FIG. 1, the stub shaft 38 and the screw shaft 42 are disposed in coaxial relation with each other and the end portion of the screw shaft 42 is extended through a partition wall 31a of the valve housing 31 into the interior thereof and has a driven disk 69 formed into a unitary construction with the screw shaft 42. This driven disk 69 is fitted into the recess 56 at the end of the small-diameter portion 53b of the valve housing 53 rotatably fitted into the valve housing 31. Both the driven disk 69 and the valve housing 53 are rotatably journaled by a thrust bearing 70 interposed between the recess 55 at the end of the large-diameter portion 53a of the valve housing 53 and the inner surface of the cover 35, and a thrust bearing 71 interposed between the driven disk 69 and the partition wall 31a of the valve housing 31. It should be noted that the movement of the driven disk 69 and the valve housing 53 in the longitudinal direction is limited by the above-described pair of thrust bearings 70 and 71. The stub shaft 38 in coaxial alignment with the screw shaft 43 is rotatably fitted into the through bore 54 in the valve housing 53 with a gap therebetween and is journaled by a needle bearing 72 which in turn is fitted into the through bore 54 of the valve housing 53. A torsion bar 73 is fitted into the stub shaft 38 and coupled thereto through a pin 74, and a guide 75 is fixed to the torsion bar 73 by a pin 76 at the end remote from the pin 74. The guide 75 is fitted into a blind hole 77 formed at the center of the driven disk 69 of the screw shaft 42. Projections 78 extending from the driven disk 69 are fitted into the grooves 54a, 54b and 54c of the through bore 54 of the valve housing 53 as shown in FIG. 5. A projection 79 extending from the guide 75 is fitted into the groove 54c of the through bore 54. These projections 78 and 79 are snugly fitted into the grooves so that the screw shaft 42, the valve housing 53 and the guide 75 may be rotated without causing any angular deviation with respect to each other. That is, they may rotate completely in unison with each other. The stub shaft 38 is coupled to the screw shaft 42 through the guide 75, valve housing 53 and the torsion bar 73.

The stub shaft 38 is also provided with a projection 80 (see FIG. 7) which is fitted into the right and left grooves 54a and 54b of the through bore 54 of the valve housing 53. In the instant embodiment, the projection 80 is smaller in width than the grooves 54a and 54b when the torsion bar 73 is not twisted at all in either direction, the projection 80 is spaced apart from the inner surfaces of the grooves 54a and 54b by predetermined distances 81. When the stub shaft 38 rotates, the projection 80 is so displaced that one of the distances 81 is eliminated and a relative angular deviation between the stub shaft 38 and the valve housing 53 may be permitted until the projection 80 contacts with one of the inner end walls of the grooves 54a and 54b. When the projection 80 contacts with the inner end walls of the grooves 54a and 54b, the stud shaft 38 and the valve housing are rotated with the above-described relative angular deviation being retained therebetween so that the screw shaft 42 may be rotated via the projections 78 of the driven disk 69.

This means that the rotation of the stub shaft 38 can be transmitted through the projection 80 and the grooves 54a and 54b to the screw shaft 42 without the use of hydraulic pressure so that the piston 41 may be displaced in a desired direction via the externally threaded portion 42a and the balls 43, whereby the steering wheels may be steered mechanically via the sector gear 50 and the pitman arm 52.

Referring again to FIG. 1, the valve housing 53 rotatably fitted into the valve housing 31 has its large-diameter portion 53a cover the annular groove formed in the inner surface of the valve housing 31, and an annular passage 84 which is sealed by seals 82 and 83 is formed. The annular groove formed in the outer peripheral surface of the small-diameter portion 53b is covered by the inner surface of the partition wall 31a of the housing 31 so that the annular passage 68 is defined. Both of the end faces of the large-diameter portion 53a are spaced apart from the inner surfaces of the cover 35 of the housing 31 and the partition wall 31a thereof so that independent communication passage 87 and discharge passage 88 are defined and they are sealed by a seal 85 fitted into a groove formed in the inner surface of partition wall 31a, a seal 82 fitted into a groove formed in the outer peripheral surface of the large-diameter portion 53a, a seal 86 fitted into a groove formed in the outer peripheral surface of the cover 35 and a seal 83 fitted into a groove formed in the outer peripheral surface of the large-diameter portion 53a.

A valve spool 89 is slidably fitted into the valve sleeve 60 which in turn is fitted into the valve hole 57 of the valve housing 53. As best shown in FIG. 7, the valve spool 89 is provided with three land members 90, 91 and 92 which divide the interior of the valve sleeve 60 into two chambers 93 and 94. When the valve spool 89 is in "neutral" position relative to the valve sleeve 60 (the position illustrated in FIG. 7), throats 95, 96, 97 and 98 between the lands 90, 91 and 92 and the annular grooves 61, 62 and 63 of the valve spool 60 are maintained at the same degree of opening so that the annular grooves 61, 62 and 63 of the valve sleeve 60 are intercommunicated with the chambers 93 and 94. As shown in FIGS. 1 and 7, the annular grooves 62 and 63 are intercommunicated with the annular passage 84 of the valve housing 31 through the bores 65 of the valve housing 53 so that the annular grooves 62 and 63 are normally communicated to an intake port 99 of the valve housing 31 through the annular passage 84 irrespective of the rotation of the valve housing 53. On the other hand, the annular groove 61 is normally communicated with a discharge port 100 of the valve side housing 31 through the bore 64 of the valve housing 53 and the discharge passage 88. The chamber 93 is communicated with the pressure chamber 48 through the bore 66 of the valve housing 53, the communication passage 87, and a bore 101 formed through both of the housings 31 and 32. The chamber 94 is communicated with the right pressure chamber 49 of the piston 41 through the bore 67 of the valve housing 53, the annular passage 68 of the small-diameter portion 53b and a bore 102 formed through the partition wall 31a of the valve housing 31.

As best shown in FIG. 7, plungers 103 and 104 are slidably fitted into the lever hole 58 of the valve housing 53 and have flanges 103a and 104a respectively which are fitted into recesses 58a and 58b formed around both of the openings of the lever hole 58. Lever rods 105 and 106 which are transmitting members, are slidably fitted into the plungers 103 and 104 respectively and have flanges 105a and 106a respectively, which are pressed against the end faces of the plungers 103 and 104. The free end of an arm member 107 fixed integrally to the stub shaft 38 is interposed between flanges 105a and 106a. Thus, hydraulic reaction mechanisms generally designated by 108 are provided. In the recessed portions 59 on both sides of the valve housing are pivotably fixed head levers 109 and 110 by means of pivots 111 and 112 respectively in such a manner that the upper ends of the head levers 109 and 110 contact with the free ends of the valve spool 89 while the lower ends of the head levers 109 and 110 contact with the free ends of the lever rods 105 and 106 respectively. Thus, a valve-switching mechanism is constituted by the arm 107, lever rods 105 and 106 and the head levers 109 and 110.

When an angular relative deviation between the stub shaft 38 and the valve housing 53 occurs while the torsion bar 73 is twisted, the valve spool 89 is selectively displaced toward the right or left via the arm 107, the lever rods 105 and 106 and the head levers 109 and 110, and at the same time the free ends of the plungers 103 and 104 which constitute the hydraulic reaction mechanisms are extended into the recesses 59 of the valve housing 53 which are in communication with the annular passage 84. Therefore, the hydraulic pressure (load pressure) produced in the pressure chamber 48 or 49 in proportion to the steering resistance when the steering wheels are steered is applied to the free ends of the plungers 105 and 106, so that both of the plungers 105 and 106 are pushed toward the arm member 107.

Next the mode of operation of the first embodiment described hereinabove with reference to FIGS. 1 to 9 will be described hereinafter.

When no force is applied to the steering wheel, the stub shaft 38 and the valve housing 53 which is coupled to the stub shaft 38 through the torsion bar 73 are in the position at which the torsion bar 73 is not twisted at all (see FIGS. 6 and 7). Therefore the valve spool 89 which is coupled to the stub shaft 38 via the arm member 107, the lever rods 105 and 106 and the head levers 109 and 110 is held in "neutral position" as shown in FIGS. 6 and 7, in the valve sleeve 60 fitted into the valve hole 57 of the valve housing 53. Consequently, as shown in FIGS. 1, 6 and 7 the working liquid which is supplied to the intake port 99 by a hydraulic pump is returned to a tank through the annular passage 84, the bore 65, the annular grooves 62 and 63, the throats 95 and 96, the chambers 93 and 94, the throats 97 and 98, the annular groove 61, the bore 64, the discharge passage 88 and the discharge port 100. Therefore the pressure within the left pressure chamber 48 of the power cylinder in communication with the chamber 93 through the bore 66, the communication passage 87 and the bore 101 is maintained equal to the pressure within the right pressure chamber 49 which is in communication with the chamber 94 through the bore 67, the passage 68 and the bore 102, so that the forces acting upon the both ends of the piston 41 are equal, whereby the piston 41 is held in stationary position.

At the same time, the pressures act upon the free ends of the plungers 103 and 104 and the lever rods 105 and 106 in the recesses portions 59 of the valve housing 53 so that all of the plungers 103 and 104 and the lever rods 105 and 106 are forced toward the arm member 107. However, the effective pressure receiving areas of the plungers 103 and 104 and the lever rods 105 and 106 are made equal so that the pressures acting upon the arm member from the right and left are equal whereby the power steering device is held in stationary position. When the steering wheel is rotated in the counterclockwise direction so as to turn the steering wheels to the left, the valve housing 53 and the screw shaft 42 coupled thereto through the driven disk 69 are to be rotated to the left via the torsion bar 73 and the guide 75, but upon the screw shaft 42 is exerted the resistance from the steering wheels because the screw shaft 42 is coupled to the steering wheels through the piston 41, the sector gear 50 and the pitman arm 52. Because of this resistance, the screw shaft 42 and the valve housing 53 are at rest while only the stub shaft 38 rotates in the counterclockwise direction by twisting the torsion bar 73 so that the relative angular deviation is caused between the stub shaft 38 and the valve housing 53. Consequently upon the rotation in the counterclockwise direction of the stub shaft 38, the lever rod 106 is pushed toward the right through the arm member 107 as shown in FIGS. 8 and 9 and at the same time the valve spool 89 is caused to displace toward the left through the head lever 110, thereby opening the throats 95 and 98 while closing the throats 96 and 97. Upon the displacement of the valve spool 89 toward the left, the upper end of the head lever 109 is pushed toward the left so that the lower end thereof pushes the lever rod 105 toward the arm 107, thereby preventing the flange 105a from being spaced away from the arm 107. Thus, it will be seen that upon the displacement of the arm 107 toward the right, the valve spool 89 is displaced toward the left in proportion to the lever ratio of the head lever 110.

As shown in FIGS. 8 and 9, upon displacement toward the left of the valve spool 89, the working liquid forced to the port 99 by the hydraulic pump is forced into the left pressure chamber 48 of the power cylinder through the passage 84, the bore 65, the annular groove 62, the throat 95, the chamber 93, the bore 66, the passage 87 and the bore 101. On the other hand, the working liquid in the pressure chamber 48 is returned to the tank through the bore 102, the passage 68, the bore 67, the chamber 94, the throat 98, the annular groove 61, the bore 64, the passage 88 and the discharge port 100. Therefore, because of the pressure difference in the pressure chambers 48 and 49, the piston 41 is caused to move toward the right in FIG. 1 so that the steering wheels are turned to the left through the rack 41a, the sector gear 50 and the pitman arm 52. At the same time the screw shaft 42 and the valve housing 53 coupled thereto causes guide 75 to rotate in the counterclockwise direction. Thus, as long as the stub shaft 38 is rotated in counterclockwise direction, the torsion bar 73 remains twisted in the counterclockwise direction and follows the rotation of the stub shaft 38 so that the screw shaft 42 and the valve housing 53 are rotated in the counterclockwise direction. Consequently, the working liquid is continuously forced into the left pressure chamber 48 of the power cylinder by the hydraulic pump so that the piston 41 is forced toward the right, thereby turning the steering wheels to the left.

When the steering wheel is rotated in the counterclockwise direction so that a relative angular deviation in the counterclockwise direction between the stub shaft 38 and the valve housing 53 occurs and the lever rod 106 is forced to the right via the arm 107, the plunger 104 is forced toward the right by the flange 106a of the lever rod 106 of the right hydraulic reaction mechanism 108. In the left hydraulic reaction mechanism 108, the flange 103a of the plunger 103 is stopped by the stepped portion 58a of the lever hole 58 of the valve housing 53 so that only the lever rod 105 is caused to slide toward the right in the plunger 105 while the latter is at rest. Consequently, the flange 105a of the lever rod 105 is moved away from the end face of the plunger 103. The force $F_1$ acting upon the arm 107 so as to displace it toward the left and the force $F_2$ acting upon the arm 107 so as to displace it toward the right are given by:

$F_1=(a_1+a_2) P$ and
$F_2=a_2 P$ where $P =$ the pressure in the pressure chamber 48 in proportion to the steering resistance; and $a_1$ and $a_2 =$ effective pressure receiving areas at the ends of the plungers 103 and 104 and at the ends of the lever rods 105 and 106, respectively.

Figure 22:
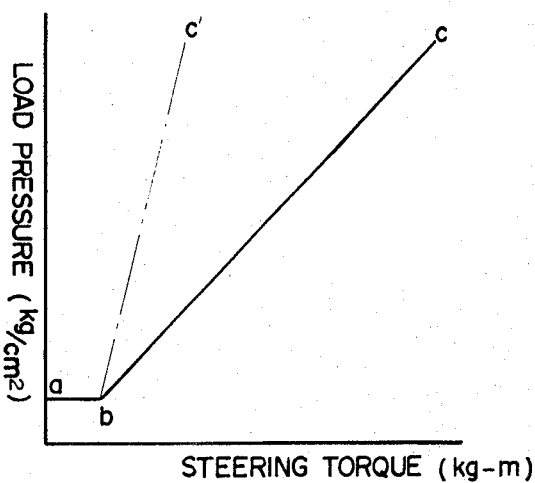
FIGS. 22, 23 and 24 are graphs illustrating the relation between the load pressure and the steering torque of the first, second and third embodiments of the present invention, respectively.

Therefore, the arm 107 is pushed toward the left by the force F $F=F_1-F_2=a_1 P$ It should be noted that the force $F$ is determined by the pressure $P$ which in turn is determined by the steering resistance so that the hydraulic reaction force in proportion to the steering resistance is felt by a driver through the steering wheel, the arm 107 and the stub shaft 38. When the steering wheel is rotated in the counterclockwise direction so as to turn the steering road wheels to the left, the driver's feeling of the road through the steering wheel, that is the steering torque, varies for example as shown by the chain line $a-b-c'$ in FIG. 22 because the steering torque is in proportion to the angle of twist of the torsion bar 73 only when the latter is taken into consideration, and the angle of twist of the torsion bar is in proportion to the steering resistance, that is the load pressure. However, in the instant embodiment where the hydraulic reaction force is produced by the hydraulic reaction mechanisms 108 when the load pressure is increased upon the displacement of the valve spool 89, the hydraulic pressure within the pressure chamber 48 is maintained at a constant level because of the back pressure caused by the fluid resistance in the returning circuit as long as the steering torque applied to the steering wheel increases from zero to a such a degree that the torsion bar 73 is twisted and the valve spool 89 is displaced. Thus, when the steering torque reaches the point *b* and the valve spool 89 is displaced, the load pressure varies in proportion to the steering resistance and at the same time a hydraulic reaction force in proportion to the load pressure is produced so that the steering torque varies as shown by the solid line *a–b–c* in response to the load pressure. Thus, the driver can feel the road sufficiently without increasing the spring constant of the torsion bar 73.

When the steering wheel is rotated in the counterclockwise direction to a desired direction and then stopped, the stub shaft 38 is immediately stopped while the valve housing 53 is caused to rotate slightly in the counterclockwise direction via the screw shaft and under the influence of the force moving the piston 41 to the right as well as of the returning force of the torsion bar 73. Upon rotation of the valve housing 53, the valve spool 89 is returned to the "neutral position" with respect to the valve sleeve 60 of the valve housing 53 via the arm 107, the lever rods 105 and 106 and the head levers 109 and 110 so that the openings of the throats 95, 96, 97 and 98 are made equal as shown in FIGS. 6 and 7. Consequently, there exists no pressure difference between the right and left pressure chambers 49 and 48 and the hydraulic reaction forces from the hydraulic reaction mechanisms 108 acting upon the arm member 107 are balanced. In this case, the torsion bar 73 is also returned to its normal position where the bar 73 is not twisted in neither direction. The piston 41, the screw shaft 42 and the valve housing 53 are all stopped and the steering road wheels are maintained at angles which are determined by the angle of rotation of the steering wheel. The mode of operation when the steering wheel is rotated in the clockwise direction will be easily understood from the above description since the parts, components and mechanisms are all arranged in symmetrical relation, so that a further description will not be necessary.

When the steering wheel is set free after steering in either direction, the force produced by the automatic recovering movement of the front wheels is transmitted to the piston 41 through the pitman arm 52 and the sector gear 50, so that the screw shaft 42 as well as the valve housing 53 are caused to rotate while the piston 41 returns to its normal or center position. Upon rotation of the valve housing 53, stub shaft 38 is caused to rotate by the torsion bar 73 so that the steering wheel is returned to the neutral position as in the case of a conventional power steering system.

Now to referring to FIGS. 10 to 16, the second embodiment of the present invention will be described hereinafter. Since the second embodiment is different from the first embodiment only in the hydraulic reaction mechanisms, only the latter need be described and it should be noted that like parts are designated by like reference numerals. Referring particularly to FIG. 12, the hydraulic reaction mechanisms 208 of a power steering device 200 of the second embodiment comprise plungers 203 and 204 slidably fitted into a lever hole 258 of the valve housing 53, sleeves 201 and 202 screwed to the plungers 203 and 204 respectively, and the lever rods 105 and 106 slidably fitted into the sleeves 201 and 202 respectively. Spring-receiving members 205 and 206 are slidably fitted over the plungers 203 and 204 respectively and coiled springs 209 and 210 are loaded between the spring-receiving members 205 and the 206 and one ends of the plungers 203 and 204 so that the spring-receiving members 205 and 206 are normally pressed against flanges 201a and 202a, respectively, of the sleeves 201 and 202. In this case, the spring-receiving members 205 and 206 are also pressed against the stepped portions 258a and 258b formed in the lever hole 258 while the leading end faces of the sleeves 201 and 202 are pressed against the flanges 105a and 106a of the lever rods 105 and 106 respectively. In the second embodiment, the sleeves 201 and 202 are screwed into the plungers 203 and 204 respectively and the flanges 201a and 202a are formed at the one ends of the sleeves 201 and 202 so as to engage with the spring-receiving members 205 and 206, but it will be understood that snaprings for holding the spring-receiving members 205 and 206 in position may be directly fitted over the leading end portions of the plungers 203 and 204. Next the mode of operation of the hydraulic reaction mechanism 208 of the second embodiment will be described hereinafter. As in the case of the first embodiment, when the steering wheel is not rotated, the back pressures due to the fluid passage resistances of the returning circuit act upon the end faces of the plungers 203 and 204 and upon the end faces of the lever rods 105 and 106 through the supply passage 84 and the recessed portions 59 of the valve housing 53. Therefore, the arm member 107 is pushed by both of the lever rods 105 and 106 as shown in FIG. 12. The effective pressure receiving areas of these plungers 203 and 204 and lever rods 105 and 106 are equal, so that the pressures pushing the arm 107 from both sides are balanced.

When the steering wheel is rotated in the counterclockwise direction so that the valve spool 89 is shifted toward the left while the stub shaft 38 is rotated in the counterclockwise direction relative to the valve housing 53, the working liquid under pressure is forced into the left pressure chamber 48 of the valve cylinder by the hydraulic pump as in the case of the first embodiment, and a load pressure in proportion to the steering resistance of the steering road wheels is applied to this pressure chamber 48. By the hydraulic pressure in the pressure chamber 48, the piston 41 is moved toward the right and the steering road wheels are turned to the left. As in the case of the first embodiment, the load pressure acts upon the end faces of the plungers 203 and 204 and of the rod levers 105 and 106 of the hydraulic reaction mechanism 208 through the passage 84 and the recessed portions 59 of the valve housing 53.

In the second embodiment, when the valve spool 89 is shifted toward the left as described above and at the same time when the lever rods 105 and 106 are moved toward the right by the arm 107 on the side of the stub shaft 38, the left hydraulic reaction mechanism 208 has its spring-receiving member 205 engaged with the stepped portion 258a of the lever hole 258 of the valve housing 53, and the plunger 203 and the sleeve 201 screwed to the plunger 203 push the spring-receiving member 205 via the spring 209, so that only the lever rod 105 is permitted to move toward the right. In the right hydraulic reaction mechanism 208, the flange 106a of the lever rod 106 presses the leading end of the sleeve 202 whose flange 202a in turn engages with the spring-receiving member 206. Consequently, upon displacement of the lever rod 106 toward the right, the plunger 204, the sleeve 202 and the spring-receiving member 206 are caused to move toward the right in unison while their relative positions remain unchanged so that the spring-receiving member 206 is moved away from the stepped portion 258b of the lever hole 258 of the valve housing 53. Therefore, when the steering resistance is relatively low so that the hydraulic pressure or the load pressure produced in the pressure chamber 48 is relatively low in proportion to the steering resistance, the displacement of the plunger 203 and the sleeve 201 of the left hydraulic reaction mechanism 208 is shorter than that of the lever rod 105 toward the right because of the relation between the force acting upon the plunger 203 and the sleeve 201 of the left hydraulic reaction mechanism 208 due to the above-described load pressure, and the returning force of the spring 209 which tends to cause them to return back to the left. Therefore as shown in FIG. 14 there is produced a spacing between the leading end of the sleeve 201 and the flange 105a of the lever rod 105 and as long as this spacing or gap exists the force $F_1$ of the right hydraulic reaction mechanism 208 pushing the arm 107 toward the left and the force $F_2$ of the right hydraulic reaction mechanism 208 pushing the arm 107 toward the right are given by the following relations:

$$F_1=(a_3+a_4) P$$
$$F_2=a_4 P$$

where $P =$ load pressure;

$a_3 =$ effective pressure receiving area of each end face of the plungers 203 and 204; and $a_4 =$ effective pressure receiving area of each end face of lever rods 105 and 106.

Consequently as in the case of the first embodiment, the force $$F=F_1-F_2=a_3 P$$

is acting upon the arm 107 so that the latter is pushed toward the left and this force $F$ is transmitted to the steering wheel so that the driver can feel the road.

On the other hand, when the steering resistance is increased and the load pressure in proportion thereto is accordingly increased, the force pushing the plunger 203 and the sleeve 201 of the left hydraulic reaction mechanism 208 toward the right, is increased in proportion to the load pressure. Therefore, both the plunger 203 and the sleeve 201 move toward the right and compress the spring 209. When the load pressure is in excess of a given value, the flange 105a of the lever rod 105 is pressed against the leading end of the sleeve 201 as shown in FIGS. 15 and 16 so that the lever rod 105 is moved toward the right. In this case, the force $F_1$ of the right hydraulic reaction mechanism 208 pushing the arm 107 toward the left and the force $F_2$ of the left hydraulic reaction mechanism 208 pushing the arm 107 toward the right are given by the following relations:

$$F_1=(a_3+a_4) P; \text{ and}$$
$$F_2=a_4 P+a_3 P-f$$

where $f =$ returning force of the coiled spring 209. Thus, the force $F$ pushing the arm 107 toward the left is $$F=F_1-F_2=f$$

This means that the returning force of the coiled spring 209 depending upon its spring constant is transmitted as reaction force to the steering wheel so that the driver can feel the road.

So far it has been described that the wheels are turned to the left, but the mode of operation when the steering wheel is rotated in the clockwise direction will be readily understood since the hydraulic reaction mechanisms are arranged symmetrically and their operations are reversed.

In the hydraulic reaction mechanisms 208 of the second embodiment of the present invention, when the effective pressure receiving areas of the end faces of the plungers 203 and 204 and the spring constant of the springs 209 and 210 are suitably selected, the hydraulic reaction force may be transmitted for feeling by the driver until the steering resistance reaches a predetermined degree, and when the resistance is in excess of the predetermined degree, the hydraulic reaction force may be eliminated so that the rate of increase of the steering torque in relation to the increase of the steering resistance may be maintained at a low value, whereby the steering operation can be effected with less effort.

Figure 23:
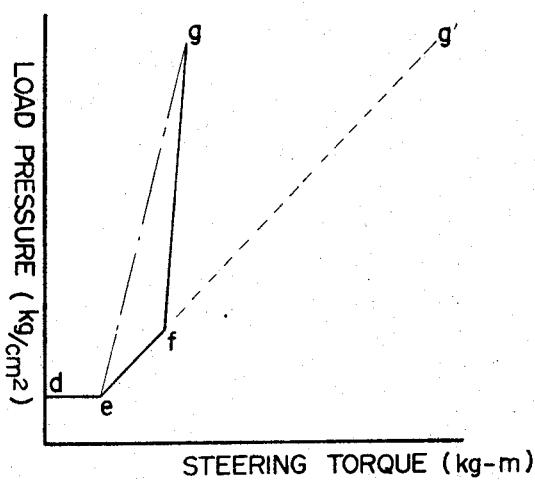

The mode of operation of the second embodiment will be further described with particular reference to a graph illustrated in FIG. 23. When the steering torque is increased from zero to a certain value at which the torsion bar 73 is twisted and the valve spool 89 is shifted, the hydraulic pressure within the pressure chambers 48 and 49 remains unchanged as shown by the line between the points $d$ and $e$ because of the back pressure due to the resistance of the hydraulic return circuit while the steering torque is only increased. When the steering torque reaches the point $e$ and the valve spool 89 is shifted, a load pressure in proportion to the steering resistance of the steering road wheels is applied to the pressure chamber 48 or 49.

When the load pressure is at a value between the points $e$ and $f$, the hydraulic reaction force is produced by the hydraulic reaction mechanisms 208 and the steering torque varies from the point $e$ to the point $f$. When the load pressure is in excess of the point $f$, only the coiled spring 209 or 210 of the hydraulic reaction mechanisms 208 is actuated so that the steering torque is varied from the point $f$ to the point $g$. It should be noted that the dotted line between the points $f$ and $g'$ indicates the relation between the load pressure and the steering torque of a power steering system having no hydraulic reaction force cutting device, such as the first embodiment of the present invention.

The chain line connecting the point $e$ and the point $g$ indicates the relation between the load pressure and the steering torque only when the twisting of the torsion bar 73 is used. From the above, it will be readily seen that when the steering resistance is relatively low, as for example in a vehicle travelling at a high speed, the hydraulic reaction force is produced so as to increase the steering effort, and when the steering resistance is high, as for example when the vehicle is at rest, the hydraulic reaction force may be automatically cut off so that the reaction force is produced only by the coiled spring, thereby reducing the steering effort.

Next referring to FIGS. 17 to 21, the third embodiment of the present invention will be described hereinafter. The third embodiment also contemplates to increase the steering effort when the steering resistance of the front wheels is high, as for example when a vehicle travels at high speed, thereby improving the stability and maneuverability of the vehicle at high speed, and to reduce the steering effort when the steering resistance is high, as for example when the vehicle is at rest. In the second embodiment of the present invention, the above purpose is accomplished by the provision of a hydraulic reaction cutoff system, but while in the third embodiment there is employed the steering torque correction system when the spring constant of the torsion bar may be increased so that the system may become simple in construction. As in the case of the second embodiment, the third embodiment is different from the first embodiment only in the hydraulic reaction mechanism so that only the latter will be described in detail while a description of other parts will not be made. It should be noted that the same parts are designated by same reference numerals in both of the first and third embodiments.

Figure 17:
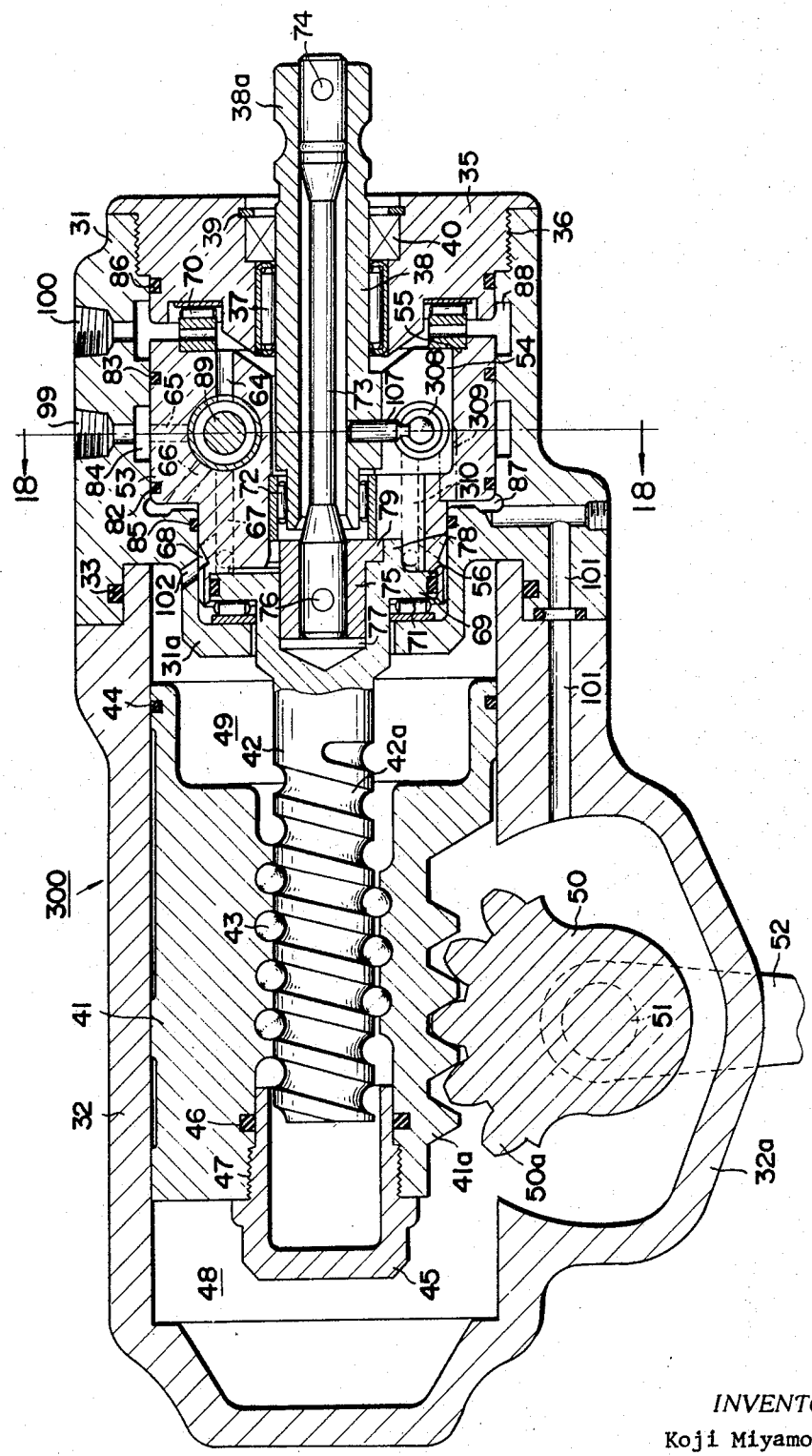
FIG. 17 is a longitudinal sectional view of a third embodiment of the present invention incorporating therein the steering torque correction mechanism.

Referring particularly to FIG. 19, the steering torque correction mechanism 308 of the power steering device 300 comprises plungers 303 and 304 having large-diameter portions 303a and 304a and small-diameter portions 303b and 304b respectively, said plungers 303 and 304 being slidably fitted into the lever hole 358 bored through the valve housing 53. The outer peripheral surfaces of the large-diameter portions 303a and 304a of the plungers 303 and 304 are in slidable contact with the inner surface of the lever hole 358 while the small-diameter portions 303b and 304b are guided through the holes bored through cover members 301 and 302 fitted into both openings of the lever hole 358. Therefore, hydraulic liquid chambers 305 and 306 are defined between the large-diameter portions 303a and 304a and the cover members 301 and 302 respectively. The arm 107 extending into the groove 54c of the through bore 54 of the valve housing 53 from the stub shaft is interposed between the leading end faces of the large-diameter portions 303a and 304a, and the free ends of the small-diameter portions 303b and 304b are pressed against the lower ends of the head levers 109 and 110 respectively. It will be readily seen that the plungers 303 and 304 also serve as the lever rods in the first and second embodiments of the present invention. As shown in FIG. 17, the hydraulic pressure chamber 305 is in communication via a through bore 309 bored through the valve housing 53 with the communication passage 87 which in turn is in communication with the left pressure chamber of the power cylinder while the hydraulic pressure chamber 306 is in communication via a through bore 310 bored through the valve housing 53 with the passage 68 which in turn is in communication with the pressure chamber 49.

Next the mode of operation of the steering torque correction mechanism of the third embodiment will be described hereinafter. When the steering wheel is not rotated, the back pressures due to the return circuit resistance act upon the free ends of the small-diameter portions 303b and 304b of the plungers 303 and 304 through the supply passage 84 and the recessed portions 59 of the valve housing 53. In this case the valve spool 89 is in its "neutral position" (see FIG. 19) so that the back pressure is applied to the hydraulic pressure chamber 305 through the passage 87 and the bore 309, and is applied to the hydraulic pressure chamber through the passage 68 and the through bore 310. Consequently both of the plungers 303 and 304 are pressed against the arm 107 from both directions. When the diameters of the large-diameter portions 303a and 304a are equal and when the diameters of the small-diameter portions 303b and 304b are equal, the forces acting upon the arm from the plungers 303 and 304 are balanced so that the arm 107 is held in position as shown in FIG. 19. When the steering wheel is rotated in the counterclockwise direction so that, as in the case of the first and second embodiments, the valve spool 89 is shifted toward the left as shown in FIG. 21 via the stub shaft 38, the arm 107, plungers 303 and 304 of the steering torque correction mechanism 308 and the head levers 109 and 110, the working liquid under pressure is forced by the hydraulic pump into the left pressure chamber 48 of the power cylinder and a load pressure in proportion to the steering resistance is applied to the pressure chamber 48 so that the piston 41 is moved toward the right by the load pressure, whereby the steering road wheels are turned to the left. The above-described operation is similar to those of the first and second embodiments described hereinabove. In the third embodiment, the load pressure acts upon the free ends of the small-diameter portions 303b and 304b of the plungers 303 and 304 of the steering torque correction mechanism 308 through the passage 84 and the recessed portions 59 of the valve housing 53, and is applied to the left hydraulic pressure chamber 305 through the communication passage 87 and the bore 309. On the other hand, the right hydraulic pressure chamber 306 is communicated with the tank through the bore 310 and the passage 68. The force $F_1$ of the left plunger 303 pushing the arm 107 to the right and the force $F_2$ of the right plunger 304 pushing the arm 107 to the left are given by the following relations:

$F_1 = \pi/4 \, d_1^2 \, P$ and
$F_2 = \pi/4 \, d_2^2 \, P$ where $d_1$ = diameter of each large-diameter portion 303a and 304a, $d_2$ = diameter of each small-diameter portion 303b and 304b and $P$ = load pressure.

Hence, the arm 107 is pushed toward the right by the force $F$ $F = F_1 - F_2 = \pi/4 \, (d_1^2 - d_2^2) \, P$ This force $F$ serves to rotate the steering wheel in the counterclockwise direction, that is the direction to be steered via the arm 107 and the stub shaft 38.

On the other hand, when the steering wheel is rotated in the clockwise direction, the valve spool 89 is shifted toward the right so that the load pressure is transmitted to the right pressure chamber of the power cylinder and to the right hydraulic pressure chamber 306 of the steering torque correction mechanism 308. At the same time, the left hydraulic pressure chamber 305 is communicated with the tank. Thus, an operation similar to that when the steering wheel is rotated in the counterclockwise direction is effected.

Figure 24:
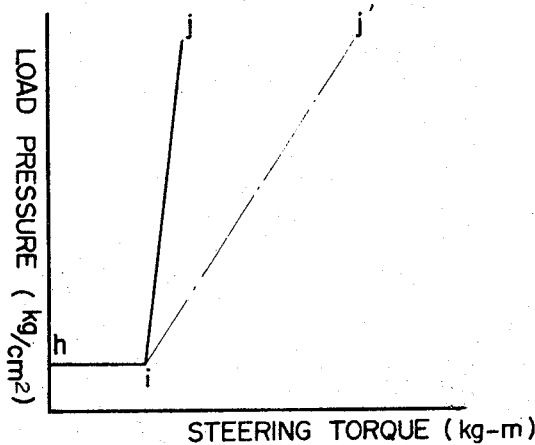

The third embodiment of the present invention brings about the same result as when the spring constant of the torsion bar 73 is reduced because the steering torque is corrected by the load pressure applied to the pressure chamber 305 or 306 of the steering torque correction mechanism 308 after the valve spool 89 has been displaced or shifted. When the spring constant of the torsion bar 73 is so selected that the relation between the steering torque and the load pressure may be indicated by the chain line $h$, $i$ and $j'$ in FIG. 24, and when the diameters of the large-diameter portions 303a, 304a are equal and the diameters of the small-diameter portions 303b and 304b of the plungers 303 and 304 of the steering torque correction mechanism 308 are equal, the steering torque is relatively increased as indicated by the solid line $h$, $i$ and $j$ when the load pressure is relatively low. Thus, the rate of change in the steering torque for a given load pressure may be suitably adjusted by correcting the steering torque. When the spring constant of the torsion bar 73 is relatively high, the stability and safe maneuverability at high speed can be ensured in the mechanism which is simple in construction as compared with the second embodiment. When the steering resistance is high as, for example, when a vehicle is at rest, the steering effort or torque may be reduced. Although the present invention has been so-far described as being applied to the particular power steering system as shown in the above-described embodiments, it will be understood that the present invention may be applied to other types of power steering systems and that variations and modifications can be effected without departing from the true spirit of the present invention as described hereinabove and as defined in the appended claims.

What is claimed is:

1. A power steering system comprising
   an input shaft,
   an output shaft coupled in coaxial alignment with said input shaft through a torsion bar for angular displacement with respect to said input shaft,
   a valve housing coupled in unitary construction to said output shaft, said input shaft being fitted into said valve housing with a gap therebetween, and
   a valve spool and lever rods which are slidably fitted into said valve housing in parallel with each other but at right angles relative to said input shaft which in turn is interposed between said valve spool and said lever rods,
   said input shaft having an arm extending at a right angle relative thereto and being in engagement with both of said lever rods so as to displace them in the axial direction thereof,
   said valve housing having a pair of head levers which are pivotably fixed between said valve spool and said lever rods, both ends of said pair of head levers being firmly pressed against free ends of said valve spool and said lever rods respectively,
   whereby in response to the relative angular displacement between said input shaft and said valve housing, said valve spool may be shifted through said arm, said lever rods and said head levers.

2. A power steering system as specified in claim 1 wherein said input shaft has projections which are adapted to fit into groove means formed in said valve housing, whereby the relative angular displacement between said input shaft and said valve housing is limited by said projections and said groove means.

3. A power steering system comprising
   an input shaft,
   an output shaft coupled in coaxial alignment with said input shaft through a torsion bar for angular displacement with respect to said input shaft,
   a valve housing coupled in unitary construction to said output shaft, said input shaft being fitted into said valve housing with a gap therebetween, and
   a valve spool and lever rods which are slidably fitted into said valve housing in parallel with each other but at right angles relative to said input shaft which latter is interposed between said valve spool and said lever rods,
   said input shaft having an arm extending at a right angle relative thereto and being in engagement with both of said lever rods so as to displace them in the axial direction thereof,
   said valve housing having a pair of head levers which are pivotably fixed between said valve spool and said lever rods, opposite ends of said pair of head levers being firmly pressed against free ends of said valve spool and said lever rods respectively, said valve housing having a pair of plungers which are slidably fitted into the respective lever rods respectively, each of said plungers being provided with an end face which is exposed in a working liquid, engaging means which stops said plunger at a predetermined position when said plunger is pushed into said lever rod, and means which is adapted to engage with said lever rod when said plunger is moved away therefrom for effecting the movement in unison with said lever rod, whereby said valve spool is shifted via said arm, said lever rods and said head levers in response to said relative angular displacement between said input shaft and said valve housing and either of said plungers is moved away from said lever rod in response to the movement thereof, thereby generating the hydraulic reaction force.

4. A power steering system, comprising an input shaft;

an output shaft coupled in coaxial alignment with said input shaft through a torsion bar for angular displacement with respect to said input shaft;

a valve housing coupled in unitary construction to said output shaft, said output shaft being fitted into said valve housing with a gap therebetween; and a valve spool and lever rods which are slidably fitted into said valve housing in parallel with each other but at right angles relative to said input shaft which latter is interposed between said valve spool and said lever rods, said input shaft having an arm extending at a right angle relative thereto and being in engagement with both of said lever rods so as to displace them in the axial direction thereof, said valve housing having a pair of head levers which are pivotally fixed between said valve spool and said lever rods with opposite ends of said pair of head levers being firmly pressed against free ends of said valve spool and lever rods respectively, said valve housing having a pair of plungers which are slidably fitted into said lever rods respectively, each of said plungers being provided with an end face which is exposed to a working liquid, engaging means which stops the respective plunger at a predetermined position when the plunger is pushed into the associated lever rod, and means adapted to engage with the respective lever rod when the associated plunger is moved away therefrom for effecting movement of the plunger in unison with said associated lever rod, whereby said valve spool is shifted via said arm, said lever rods and said pair of head levers in response to relative angular displacement between said input shaft and said valve housing, either of said plungers being moved away from said lever rod in response to the movement thereof, thereby generating a hydraulic reaction force, and whereby when the hydraulic pressure acting upon said end face of the respective plunger is in excess of a predetermined value, the other plunger is pushed into the associated lever rod against a coiled spring, thereby cutting off said hydraulic reaction force.

5. A power steering system comprising an input shaft, an output shaft coupled in coaxial alignment with said input shaft through a torsion bar for angular displacement with respect to said input shaft, a valve housing coupled in unitary construction to said output shaft, said input shaft being fitted into said valve housing with a gap therebetween, and a valve spool and lever rods which are slidably fitted into said valve housing in parallel with each other but at right angles relative to said input shaft which in turn is interposed between said valve spool and said lever rods, said input shaft having an arm extending at a right angle relative thereto and being in engagement with both of said lever rods so as to displace them in the axial direction thereof, said valve housing having a pair of head levers which are pivotably fixed between said valve spool and said lever rods, opposite ends of said pair of head levers being fairly pressed against free ends of said valve spool and said lever rods respectively, a hydraulic pressure chamber defined between opposite ends of each of said lever rods, whereby said valve spool is shifted through said arm, said lever rods and said pair of head levers in response to said relative angular displacement between said input shaft and said valve housing and a load pressure is applied to either of said hydraulic pressure chambers, thereby correcting the steering torque.

6. A power steering device, comprising input shaft means;

output shaft means coaxially aligned with said input shaft means;

torsion bar means coupling said output shaft means with said input shaft means for angular displacement relative to the latter;

a valve housing coupled for movement with said input shaft means and surrounding the same with clearance;

a slidable valve member and a pair of slidable rods accommodated in said valve housing at opposite sides of said input shaft means and extending transversely of the latter;

an engaging portion rigid with said input shaft means extending transversely thereof and engaging said rods operative for effecting alternate axial displacement thereof; and a pair of levers rockably mounted in said valve housing for displacement transversely to the elongation of said input shaft means and each having opposite end portions in engagement with a free end of said valve member and of one of said rods, respectively.

* * * * *